United States Patent [19]
Handler et al.

[11] Patent Number: 5,879,185
[45] Date of Patent: Mar. 9, 1999

[54] DEVICE PLATE AND FACE PLATE FOR WIRING DEVICE IN ELECTRIC CABLE RACEWAY

[75] Inventors: Jordan S. Handler, Stamford, Conn.; James G. Sutton, Grand Island, N.Y.

[73] Assignee: Mono-Systems Inc., Rye Brook, N.Y.

[21] Appl. No.: 878,088

[22] Filed: Jun. 18, 1997

[51] Int. Cl.⁶ .................................................. H01R 13/74
[52] U.S. Cl. ............................................................ 439/538
[58] Field of Search ...................................... 439/536–539

[56] References Cited

U.S. PATENT DOCUMENTS 5,158,478  10/1992  Schuplin ................................. 439/538

*Primary Examiner*—Gary Paumen
*Attorney, Agent, or Firm*—Ostrolenk, Faber, Gerb & Soffen, LLP

[57] ABSTRACT

A combination including a base plate or device plate for supporting a wiring device and a face plate over the wiring device and attached to the device plate. The device plate is positioned on an opening formed in the cover of a cable raceway for receiving a wiring device. The device plate has wiring device attachment bars at its opposite edges which are upraised above the cover of the raceway for raising up the supported wiring device. A divider is attached in the base plate of the combination and extends up from the top edge of the dividing strip in the raceway to the underside of the face plate to separate two cable carrying compartments within the raceway.

9 Claims, 4 Drawing Sheets

FIG.6
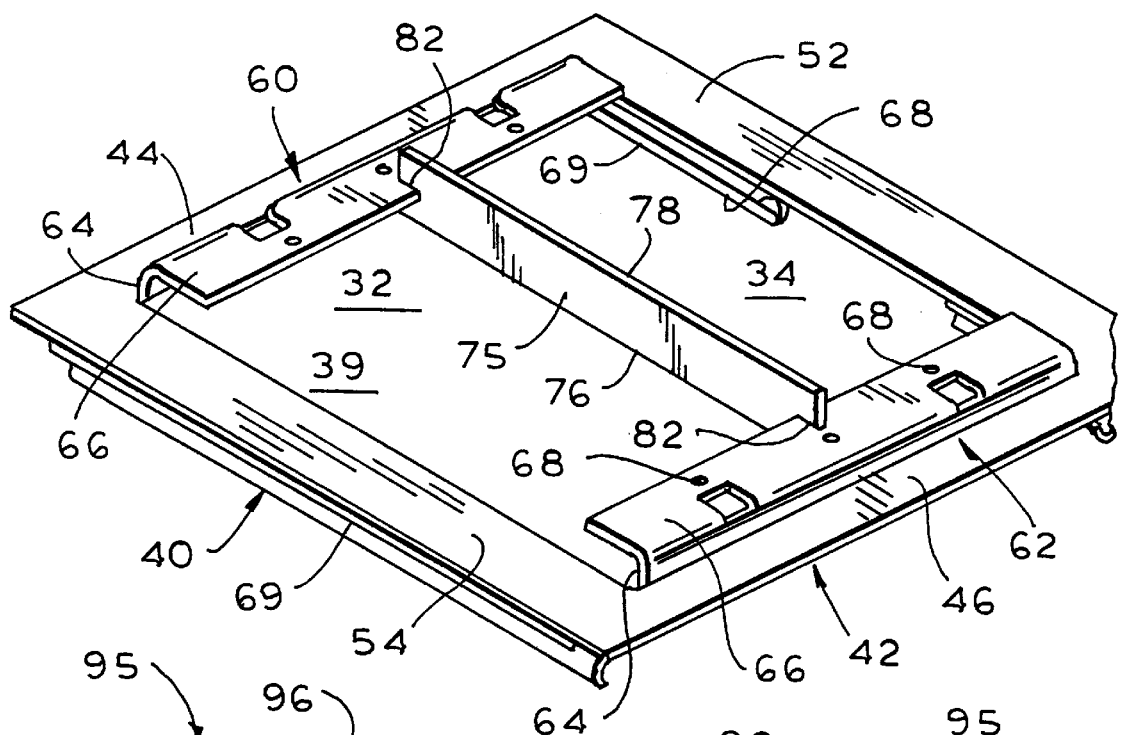
FIG.7
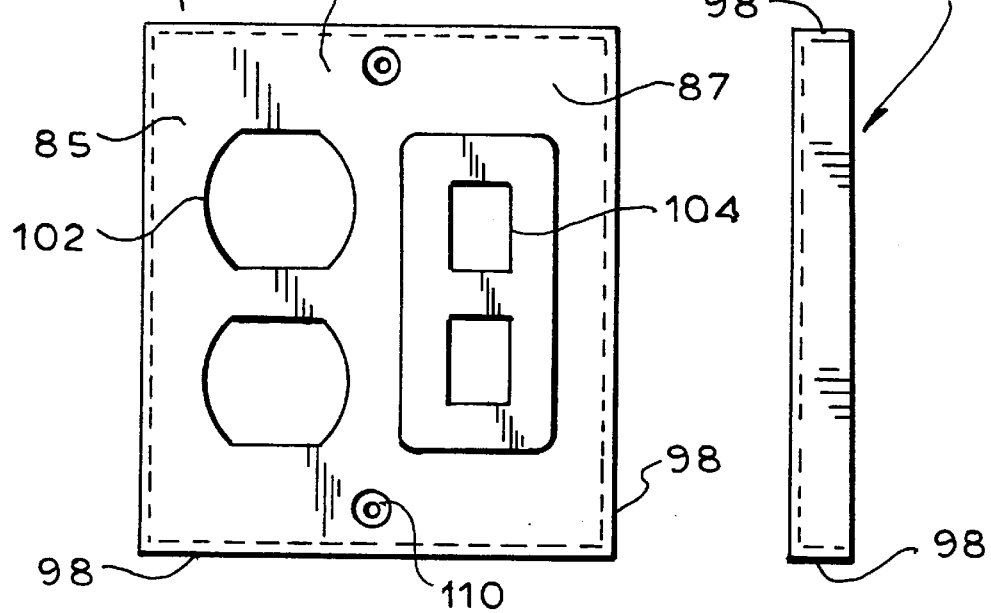
FIG.8

DEVICE PLATE AND FACE PLATE FOR WIRING DEVICE IN ELECTRIC CABLE RACEWAY

BACKGROUND OF THE INVENTION

The present invention relates to a cable raceway used to transmit cable along a structure to an electrical or wiring device and more particularly to a base plate and cover for supporting an electrical device or wiring device at an opening in the cover of the raceway.

Cable raceways support and enclose electrical cables to bring them to wiring devices or electric devices requiring the cables. A raceway may be attached to or inside and extends along a wall or ceiling. A simple form of raceway design includes a U-shaped hollow body, open on one side, and the open side is covered by a securable, removable cover to enclose the hollow raceway. The bottom wall of the raceway is generally the wall attached to the structure along which the raceway extends, so that the cover of the raceway faces outward to the side of the raceway.

A typical wiring device at the cable raceway might be any device which is to be connected to some cables passing through the raceway. The wiring device is typically supported at the raceway cover and may be supported on the cover or on a plate on the cover, etc. There is no limit on the size, configuration, or number of cable connection to a wiring device, except of course that the wiring device has to be supportable on the particular raceway embodiment. The wiring device itself typically includes support elements, e.g. brackets tabs, flanges, etc., by which it is intended that the wiring device be supported on a surface, such as on the raceway or in a wall.

At each interval along the raceway where a wiring device or electrical use device is to be positioned, there is an opening in the cover of the raceway at which the wiring device is positioned. Some of the cables in the raceway are attached to the wiring device.

A portion of the wiring device projects behind the cover or the surface of the raceway on which it is supported and projects into the raceway. It may project quite far to the bottom or rear of a shallow raceway leaving insufficient space behind the wiring device for the cables and the connection of the cables to the particular wiring device. It is often useful to be able to raise a wiring device further forward out of the raceway than positioning it on the cover over a shallow raceway would otherwise permit.

A raceway may carry cables for several purposes and at several voltages, e.g. cables supplying electricity to machinery or for operating lights and appliances, and also cables for supplying low voltage or low power equipment, such as telephones or telecommunications equipment. To prevent interference in either of the different types of cables carried in the raceway, especially due to different voltages, and to satisfy building codes of different localities, the different types of cable, e.g. cables carrying quite different voltages, should be segregated from each other in their paths along the raceway. To this end, it is typical to provide a dividing strip extending along the length of the raceway, located generally midway across the width dimension between the side walls of the U and projecting out from the bottom or rear wall of the raceway and extending to the open end or the front of the raceway, with the outer edge of the dividing strip being at the level of the edges of the side walls of the raceway. The cover closing the raceway rests on the edges of the raceway side walls and closes against the top of the dividing strip.

One or more wiring devices can be positioned at one open area along the raceway cover. Each wiring device or several wiring devices may include connections for cables carrying different voltages. For example, at a wall socket or receptacle, one frequently sees an electric socket with two higher voltage outlets for receiving electric plugs for lights or domestic appliances and two plug sockets for telephone or for other low voltage supply jacks or plugs. Alternatively, there may be a first wiring device along the raceway with only higher voltage electrical sockets and a second wiring device elsewhere along the raceway with only lower voltage sockets, e.g. telephone connections. Especially in the case of a wiring device or electrical device that has connections to two sets of cables which should normally be kept divided by the dividing wall, e.g. cables at different voltages, no means presently exists in the support on the raceway for a wiring device, and particularly in a support that raises the wiring device outward from the raceway, to keep the cables separated, for the reasons discussed above.

SUMMARY OF THE INVENTION

Accordingly, it is an object of the present invention to provide a support for a wiring device in a extending along the raceway does not extend forward or out of the raceway far enough to engage the face plate, and there is an area above the dividing strip and below the face plate where contact or electrical communication between normally separated cables is possible.

According to the invention, the device plate is provided with its own divider shaped and positioned on the device plate to extend along and above the outer free edge of the dividing strip extending between and defining the compartments of the raceway. The device plate divider is of a height and location on the device plate as to extend from the free edge of the dividing strip below the divider, upward to the underside of the face plate which will eventually be applied on the device plate. The divider of the device plate is fixed on the device plate and is either formed on the device plate or is attached to and integrated into it. The divider extending along the device plate cooperates with the dividing strip in the raceway to provide complete separation of the compartments of the raceway from the bottom of the raceway to the underside of the face plate.

Additionally, the device plate itself can be supported on the edges of the U-shaped raceway walls to raise the device plate by the thickness of the cover over the raceway. The device plate includes flanges projecting outward along the longitudinal direction of the raceway. The flanges overlap the raceway cover to extend past the edges of the opening in the cover and hide the edges of the opening, which may be unevenly cut or otherwise uneven or unattractive and also close off the opening into the raceway.

Other objects, features and advantages of the present invention will become apparent from the following description of the invention considered in conjunction with the accompanying drawings.

BRIEF DESCRIPTION OF THE DRAWINGS

FIG. 6 is a perspective of the device plate of the invention;

FIG. 7 is a top view of the face plate; and

FIG. 8 is a side view of the face plate.

DESCRIPTION OF A PREFERRED EMBODIMENT

Figure 1:
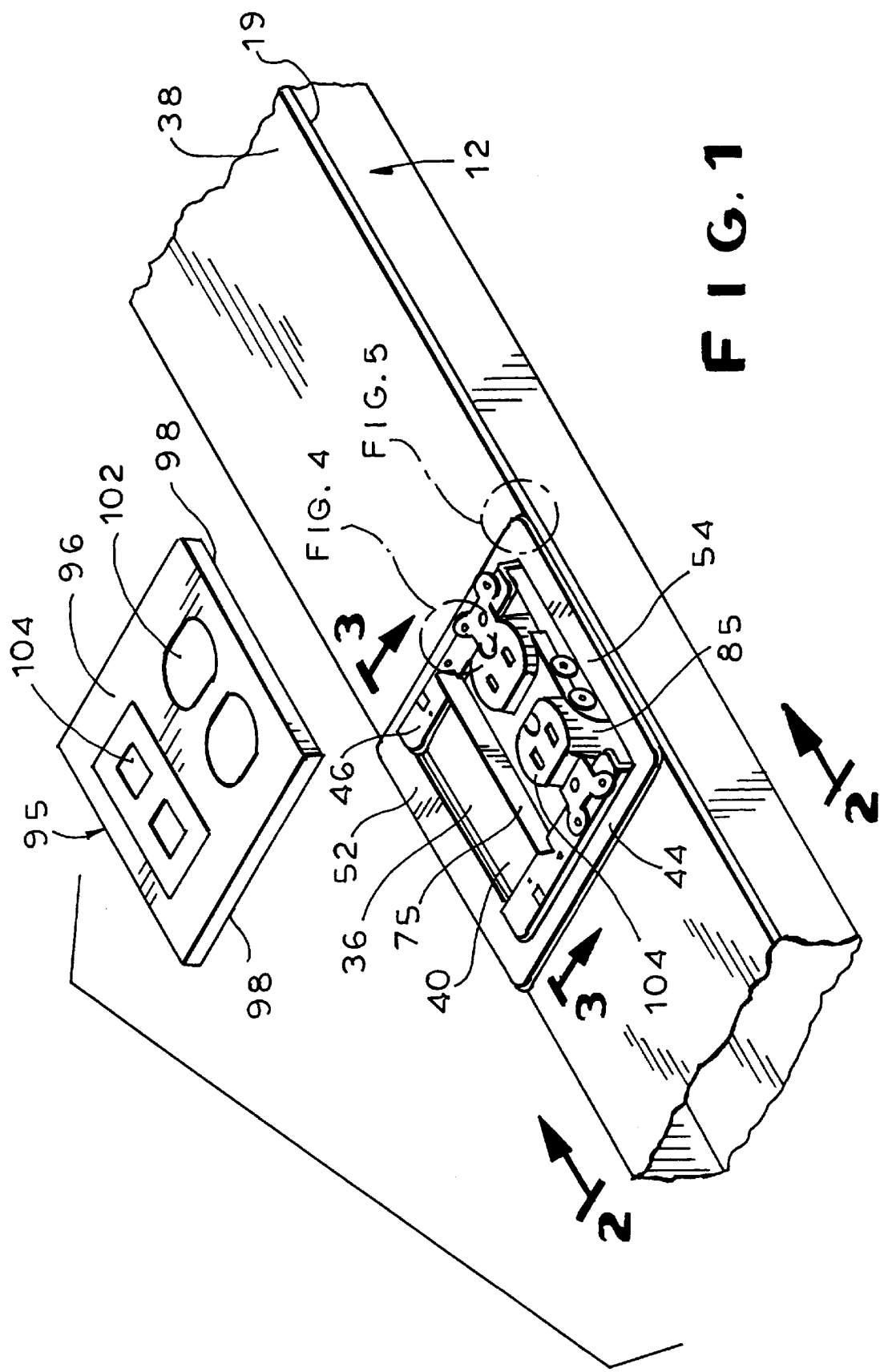
FIG. 1 is a perspective view of a section of cable raceway with the invention present.
Figure 2:
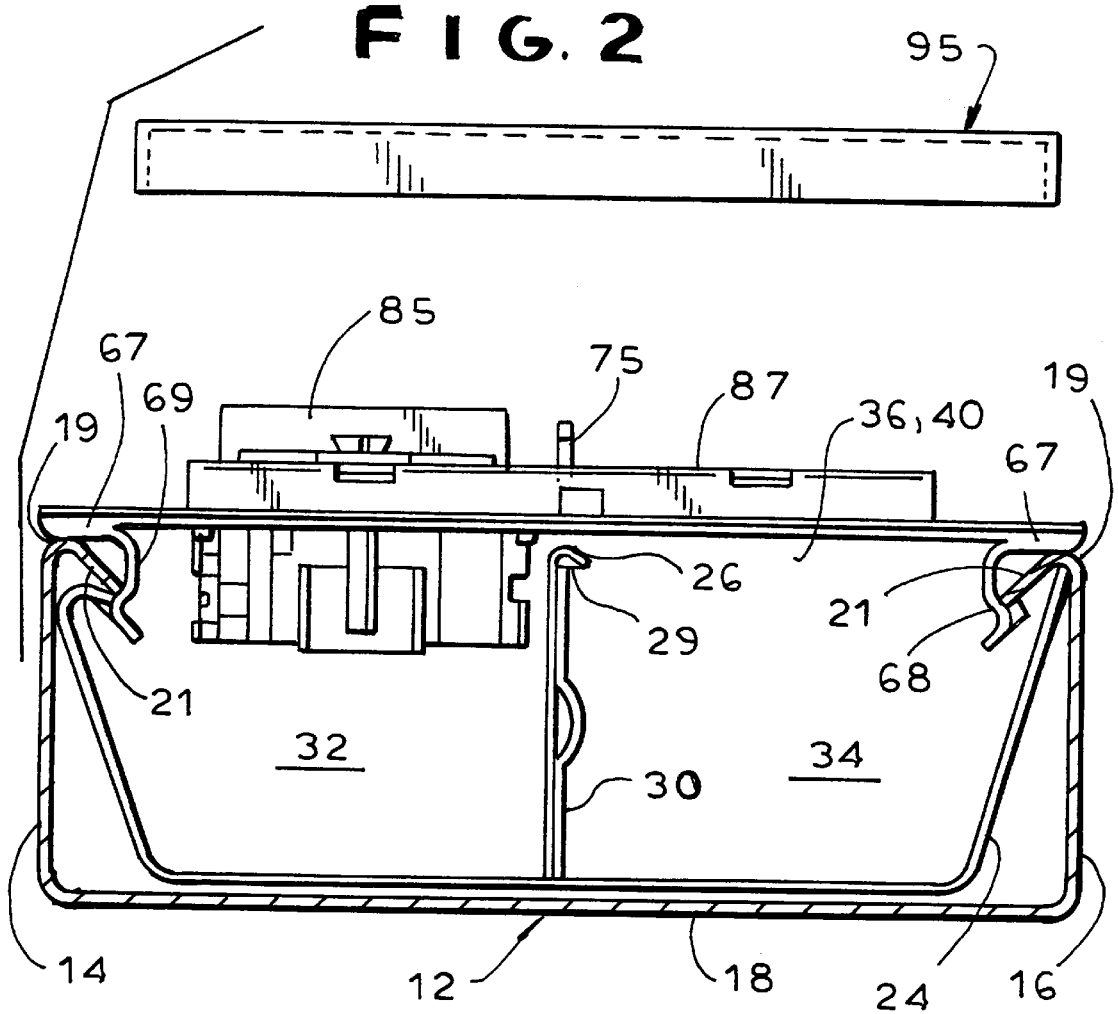
FIG. 2 is cross section through the raceway section at 2—2 in FIG. 1, showing the invention.
Figure 3:
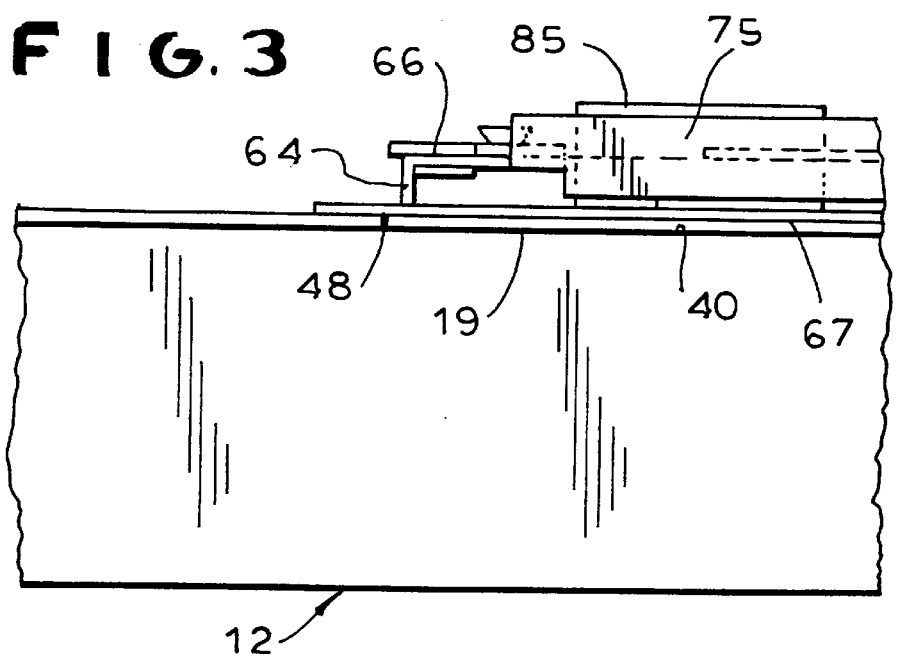
FIG. 3 is side cross sectional view at 3—3 in FIG. 1 of the raceway section near the invention, with the outer face plate off.

A length of cable raceway extends along a wall or across an entire structure (not shown). Only a small section 12 of the raceway is shown in which the present invention is included.

The raceway includes a generally U-shaped raceway body with three sides, top and bottom sides 14 and 16 when the raceway is in its normal use position on a wall and rear or bottom side 18 which would normally be fastened to a wall (not shown).

Within the U-shaped body 14, 16, 18 of the raceway there is an internal, plastic material support clip 24 for supporting a dividing strip 30. The combination of the dividing strip 30 and the divider 75, discussed below, provides unbroken separation between the lateral compartments 32, 34 in the raceway from the rear or bottom 18 of the raceway up to the face plate which closes over the device plate and a wiring device 85. Clips 24 are preferably installed at spaced intervals along the raceway. Each clip 24 has inclined sides that are trapped under the folded over locking claws 21 at the top edges 19 of the walls 14, 16.

Midway between the side walls 14 and 16 of the raceway, the clip 24 includes an upstanding support flange 26 which supports a non-conductive, plastic material, continuous dividing strip 30, which extends continuously along the entire raceway and also extends from the bottom or rear 18 of the raceway up the support flange 26 to the top of the clip 24, which is at the top edge 29 of the strip 30. This is at the height of, but not beyond, the top edges 19 of the raceway side walls 14, 16. The continuous dividing strip divides the open raceway into the compartments 32, 34, each for different types of voltage cables held separated from each other so that one wiring device might be served by the cables in compartment 32 while another wiring device can be served by cables in compartment 34.

The normally open top or front side 36 of the raceway is closed by a flat cover 38 which is removably clamped, e.g. resiliently, by friction, etc., over the open side 36 of the raceway and closes it.

The raceway cover 38 has an opening 39 defined in it by positioning panels of the cover 38 spaced apart. The margins of the two opposing spaced apart end of the cover sections may be rough cut, slightly angled, unsmooth, etc. But the invention hides all these minor defects. The length of the opening 39 along the raceway cover is approximately the length of the device plate 40 and of the length along the raceway of the wiring device or electrical device to be installed.

The present invention covers that opening 39. A device plate or base plate 40 includes a generally rectangular flat, peripheral or open center, frame 42 having transverse sides 44 and 46 which overlap the margins 48 of the opening 39 in the cover 38 of the raceway. The length of the longitudinal sides 52, 54 of the frame 42 is such that the overlap of the sides 44, 46 over the cover 38 is long enough to hide rough edges, angled cutting lines, etc. at the edges of the opening 39 in the cover 38. The sides 52, 54 of the the device plate 40 do not rest against the top edges 19 of the walls of the raceway. Instead, they are raised up by the thickness of the cover 38 of the raceway. This is in part because the transverse sides 44, 46 of the device plate 40 overlap the raceway cover. To aid in this, the undersides of the sides 52, 54 of the plate are bent inward at 67 to form the securing legs 69 and the folded in part 67 rests on the top edges 38 of the raceway walls 14, 16.

At the inward edges of the opening 39 in the rectangular frame 40, the cover 38 and the raceway beneath it define essentially open chambers into which one wiring device 85 or two wiring devices 85 and 87 may be installed next to one another in the direction across the raceway.

At each of the opposite transverse sides 44 and 46 of the frame 40, there are two supports in the form of raised wiring device attachment bars 60 and 62 whose function is to support the attachment tabs 88 or flanges of the wiring device 85.

The bars 60, 62 are generally L-shaped, with one leg 64 extending above the frame legs 44, 46 of the device plate 40 and the other horizontal leg 66 extending inward toward the opening 39 in the device plate. The upstanding leg 64 of the L can be of relatively short height, perhaps as short as ¼ inch or any other selected height. Its purpose is to raise the wiring device 85 higher out of the raceway 12 to provide more clearance for cables to pass beneath the wiring device installed in the raceway. The horizontal legs 66 of the raised device attachment bars have holes 68, et al. for receiving a fastening screw 92 at the wiring device tab 88 by which the wiring device 85 is attached to the attachment bars 62, 64.

The undersides of the longitudinally extending sides 52, 54 of the device plate 40 have resilient hooks 69 projecting below the plate which engage beneath the folded locking claws 21 formed at the edges of the cable raceway. The hooks 69 are obtained by folding under edges 67 of the device plate, and the folded over region raises the device plate over the cover 38 on the raceway.

Because the dividing strip 30 within the cable raceway has a free edge 29 that does not extend all the way up to the below described face plate 95, the device plate 40 has a divider 75 affixed to it with a bottom or inward edge 76 positioned so that it would meet the top edge 29 of the divider strip 30 in the raceway and with a top edge 78 at a height above the top edges 19 of the side walls 14, 16 and extending up to the underside of the face plate 95. The height of the divider 75 is selected to correspond to the height of the underside of the face plates 95. As shown, the divider projects above the legs 66 of the bars 62, 64 to reach the face plate 66. Other shorter or taller heights may be selected as needed.

The divider 75 is secured to the legs 66 of the raised device attachment bars 60 and 62 because the bars 60 and 62 are slotted at 82 to receive the ends of the divider. The divider may be fastened in any way at the bars 60, 62 or may be integrally formed with the bars.

The depth of the raceway from the bottom wall or inner wall 18 to the top edge 38 of the raceway walls typically may be 1¾ inches. The height of the divider 75 is approximately ¼ inch in height.

The invention may be used with any wiring or electrical device. Illustrated as a wiring device 85 is a household electric plug socket and as a wiring device 87 is a two-receptacle socket for a telecommunications cable. Any other wiring device may be supported at the raceway to be connected to the cable.

The wiring device 85 illustrated has at its opposite ends attachment tabs 88 which are of conventional design and are adapted to be secured to the raised device attachment bars 60, 62 at appropriate holes 68 or receptacles in those bars by screws 92.

Figure 4:
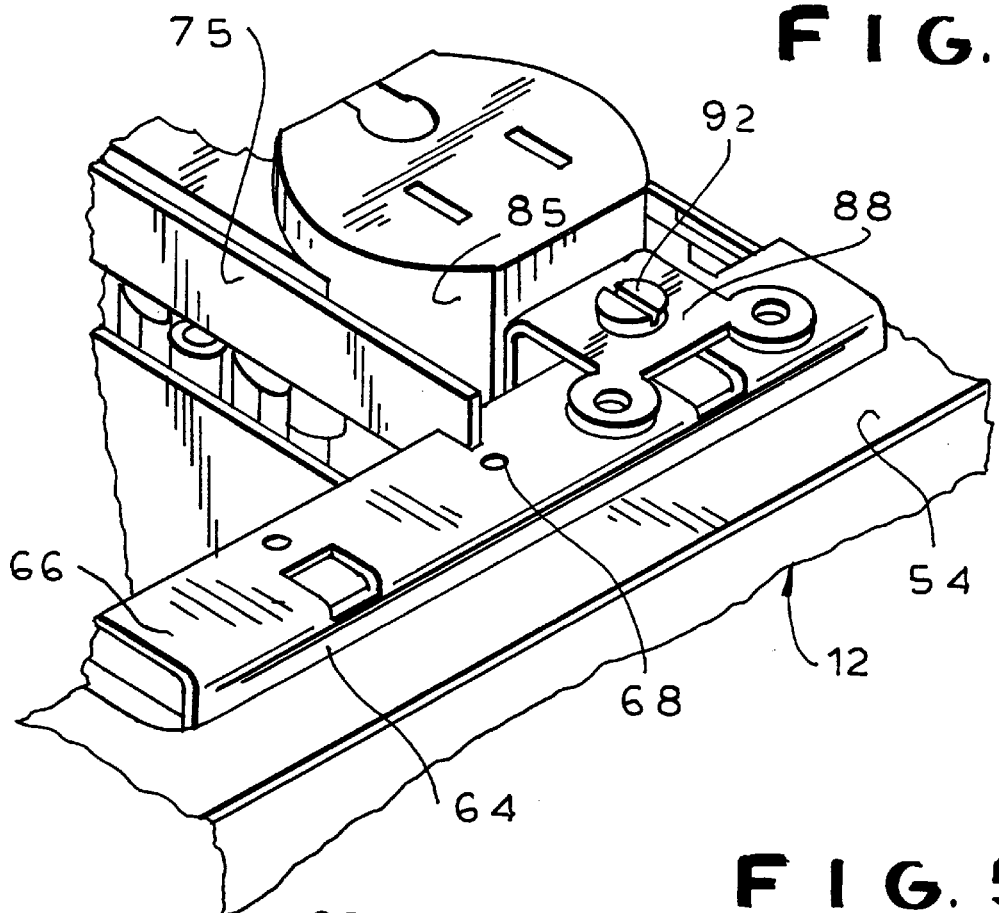
FIG. 4 is an enlarged detail of the mounting of a wiring device on the invention from the direction at detail FIG. 4 in FIG. 1.
Figure 5:
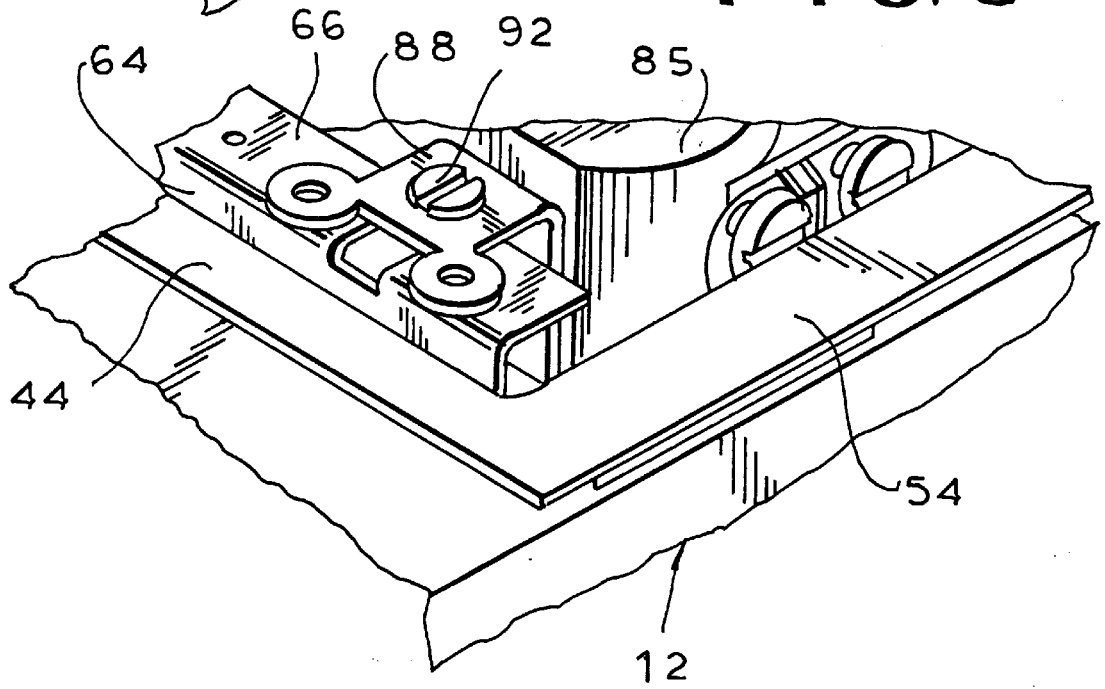
FIG. 5 shows the mounting as in FIG. 4 from another direction at detail FIG. 5 in FIG. 1.

As can be seen in FIGS. 4 and 5, the opening 40 around the wiring device 85 is exposed to view and the wiring device is exposed to contact. A face plate 95 is therefore installed over the device plate 40 and the wiring device 85 supported at the device plate to complete the support of the wiring device, to make an aesthetically pleasant construction and to prevent access by fingers, etc. to a possible dangerous area of the wiring device.

The face plate 95 is a flat plate 96 with side margins 98 that depend downwardly on the two transverse sides to cover the legs 54 of the bars 60, 62 and on the other two longitudinal sides to cover a gap between the wiring device and the frame 42 of the base plate 40 at the longitudinal sides of the base plate.

A particular wiring device to be installed in the base plate is selected. The base plate therefore has openings 102 in one area to enable the high voltage sockets of the wiring device 85 to project through and has openings 104 in another area to allow access to the jack sockets for another wiring device 87 positioned alongside the device 85. Other wiring devices with other configurations require face plates with the differently configured and placed access openings. The face plate also includes fastening screw receiving openings 110 through which a screw is passed into respective receiving hole 68 on the horizontal legs 66 of each of the bars 60, 62. The face plate completes the closure of the device.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A combination for supporting a wiring device at an opening in the cover of an electric cable raceway, the combination comprising:

a device plate having a peripheral frame for being seated at the cover of the raceway, the frame having inner edges defining a central opening permitting access through this opening; the frame being defined by transverse sides across the raceway and longitudinal sides along the raceway; the frame having a bottom;

a respective raised wiring device attachment bar at each of two opposite sides of the frame for being oriented to extend transversely of the raceway, for supporting the wiring device, and for raising the wiring device out of the raceway by the height of the raised device attachment bars, fixtures on the attachment bars to which attachment elements of the wiring device may be attached;

a face plate installable over the device plate for covering the wiring device supported at the attachment bars, the face plate having an underside and having access openings therein providing access to selected portions of the wiring device;

a divider extending between the transverse sides of the frame and essentially of the height from the bottom of the frame upward or outward to the underside of the face plate when it is installed on the device plate for dividing the region below the face plate and inside the device plate, the divider being positioned at the device plate to essentially meet the edge of a dividing strip which divides the cable raceway longitudinally, for providing a continuous divider in the raceway from the bottom of the raceway out to the face plate without enabling access past the dividing strip in the raceway and the divider on the device plate between the two compartments.

2. The combination of claim 1, wherein the face plate is attachable to the raised device attachment bars for sitting atop the bars.

3. The combination of claim 1, further comprising additional support elements below the frame of the device plate for resting on the outer edges of the walls of the raceway and the additional elements being of a height that is the thickness of the cover over the raceway, the transverse sides of the frame being of a length along the length of the raceway as to overlap the edges of the cover of the raceway at the device plate and the height of the device plate being adapted to enable the overlapping.

4. The combination of claim 1, further comprising means for attaching the device plate to the walls of the raceway.

5. The combination of claim 1, wherein the device plate is comprised of metal.

6. The combination of claim 1, wherein the divider is attached to the device attachment bars of the device plate.

7. In combination, the combination of claim 1 and a cable raceway comprising:

a generally U-shaped body including a base and attached side walls, the side walls having top edges on which the device plate is supported;

a dividing strip that extends along the length of the raceway and up from the base of the raceway to a top edge, the top edge being at the height of the top edges of the side walls and the dividing strip being positioned at a location across the raceway dividing the raceway into compartments, the raceway having an open side and a cover over the open side of the U-shaped body with an opening in the cover in which the wiring device is received;

the frame sitting on the raceway to surround and define the opening in the raceway cover; the frame being detachably attached to the raceway;

the divider at the device plate having a bottom edge at the top edge of the dividing strip, whereby the compartments in the raceway are separated by the dividing strip and by the divider upward from the base of the raceway to the underside of the face plate.

8. The combination of claim 7, further comprising a dividing strip support that is disposed in the raceway and that includes clamping elements at the sides of the raceway, and the raceway including cooperating clamping elements which clamp the dividing strip support in the raceway.

9. The combination of claim 6, further comprising the dividing strap support being at spaced locations along the raceway for supporting the dividing strip in the raceway to extend continuously along the length of the raceway.

* * * * *